United States Patent
Nakata et al.

(10) Patent No.: US 10,242,254 B2
(45) Date of Patent: Mar. 26, 2019

(54) CAMERA SYSTEM FOR A VEHICLE, CAMERA MODULE, AND METHOD OF CONTROLLING CAMERA

(71) Applicant: KYOCERA CORPORATION, Kyoto (JP)

(72) Inventors: Takatoshi Nakata, Yokohama (JP); Mizuki Suzumura, Itabashi-ku (JP)

(73) Assignee: KYOCERA Corporation, Kyoto (JP)

( * ) Notice: Subject to any disclaimer, the term of this patent is extended or adjusted under 35 U.S.C. 154(b) by 340 days.

(21) Appl. No.: 14/655,028

(22) PCT Filed: Dec. 20, 2013

(86) PCT No.: PCT/JP2013/007510
§ 371 (c)(1),
(2) Date: Jun. 23, 2015

(87) PCT Pub. No.: WO2014/103272
PCT Pub. Date: Jul. 3, 2014

(65) Prior Publication Data
US 2015/0347830 A1    Dec. 3, 2015

(30) Foreign Application Priority Data
Dec. 25, 2012  (JP) .................................. 2012-281745

(51) Int. Cl.
*G06K 9/00* (2006.01)
*G06T 11/60* (2006.01)
(Continued)

(52) U.S. Cl.
CPC ............ *G06K 9/00369* (2013.01); *B60R 1/00* (2013.01); *G06K 9/00791* (2013.01);
(Continued)

(58) Field of Classification Search
CPC ................................ B60R 1/00; G06K 9/00791
See application file for complete search history.

(56) References Cited

U.S. PATENT DOCUMENTS

| 8,988,250 | B2 | 3/2015 | Suzuki et al. |
| 2006/0111831 | A1* | 5/2006 | Sekiguchi ............. B60W 30/16 701/96 |
| 2007/0165967 | A1* | 7/2007 | Ando .................... G01S 17/023 382/291 |
| 2010/0238051 | A1 | 9/2010 | Suzuki et al. |

(Continued)

FOREIGN PATENT DOCUMENTS

| DE | 10 2011 077 398 A1 | 12/2012 |
| EP | 1 696 669 A1 | 8/2006 |

(Continued)

OTHER PUBLICATIONS

The extended European search report issued by the European Patent Office dated Jul. 27, 2016 which corresponds to European Patent Application No. 13867217.5-1503 and is related to U.S. Appl. No. 14/655,028.

(Continued)

*Primary Examiner* — Zhubing Ren
(74) *Attorney, Agent, or Firm* — Studebaker & Brackett PC (57) ABSTRACT

In a camera system (1) including a plurality of camera modules (3 to 6) that capture images of the circumference of a vehicle (2), the camera modules (3 to 6) outputting captured camera images, and a display unit (7) inside the vehicle displaying a vehicle circumferential image generated by combining each of the images, the camera modules (3 to 6) include respective object recognition units (3*j* to 6*j*) that each execute object recognition processing on a camera image captured by the camera module and communication interfaces (3*g* to 6*g*) that communicate via a vehicle network (9) provided in the vehicle (2). The communication interfaces (3*g* to 6*g*) output, to the vehicle network (9), coordi- (Continued)

nate information of an object (12) recognized by the respective object recognition units (3j to 6j).

9 Claims, 6 Drawing Sheets

(51) Int. Cl.
    *H04N 7/18*     (2006.01)
    *B60R 1/00*     (2006.01)
    *H04N 5/232*     (2006.01)
    *H04N 5/247*     (2006.01)

(52) U.S. Cl.
    CPC ......... *G06T 11/60* (2013.01); *H04N 5/23206* (2013.01); *H04N 5/23238* (2013.01); *H04N 5/247* (2013.01); *H04N 7/181* (2013.01); *B60R 2300/105* (2013.01); *B60R 2300/301* (2013.01); *B60R 2300/303* (2013.01); *B60R 2300/304* (2013.01); *B60R 2300/60* (2013.01); *B60R 2300/8033* (2013.01); *B60R 2300/8093* (2013.01)

(56) References Cited

U.S. PATENT DOCUMENTS

| | | |
|---|---|---|
| 2012/0069184 A1 | 3/2012 | Hottmann |
| 2012/0154591 A1* | 6/2012 | Baur ................. B60R 1/00 348/148 |
| 2013/0010117 A1 | 1/2013 | Miyoshi et al. |

FOREIGN PATENT DOCUMENTS

| | | |
|---|---|---|
| JP | 2007-233864 A | 9/2007 |
| JP | 2009-101984 A | 5/2009 |
| JP | 4742733 B2 | 8/2011 |
| JP | 2011-205514 A | 10/2011 |
| JP | 2012-113605 A | 6/2012 |
| WO | 2006/018951 A1 | 2/2006 |

OTHER PUBLICATIONS

International Search Report; PCT/JP2013/007510; dated Apr. 1, 2014.
Written Opinion of the International Searching Authority; PCT/JP2013/007510; dated Apr. 1, 2014, with concise explanation.

* cited by examiner

CAMERA SYSTEM FOR A VEHICLE, CAMERA MODULE, AND METHOD OF CONTROLLING CAMERA

CROSS-REFERENCE TO RELATED APPLICATION

This application claims priority to and the benefit of Japanese Patent Application No. 2012-281745 filed Dec. 25, 2012, the entire contents of which are incorporated herein by reference.

TECHNICAL FIELD

This disclosure relates to a camera system, camera module, and a method of controlling a camera. More specifically, this disclosure relates to combining a plurality of camera images captured by a plurality of camera modules into a vehicle circumferential image and outputting the vehicle circumferential image to a display unit such as a display provided in the vehicle.

BACKGROUND

One type of camera system generates a vehicle circumferential image by combining camera images captured by a plurality of camera modules attached to the front, rear, and sides of an automobile and displays the vehicle circumferential image on a display unit such as a display provided inside the vehicle to allow for visual confirmation, with one image, of the entire circumference of the vehicle. An example of such a camera system displays a vehicle circumferential image as an overhead image by applying viewpoint conversion processing to each camera image (for example, JP 4742733 B2 (PTL 1)).

Another known technique uses object recognition processing to recognize an object, such as a pedestrian or bicycle, in the vehicle circumferential image displayed by the display unit and attaches a marker to the recognized object (for example, JP 2012-113605 A (PTL 2)).

CITATION LIST

Patent Literature

PTL 1: JP 4742733 B2
PTL 2: JP 2012-113605 A

In some camera systems, the plurality of camera images captured by the camera modules are input into a control device of a display (such as a navigation system) inside the vehicle, and the control device combines the camera images and executes processing for an overhead view, object recognition, and attachment of markers to recognized objects. Therefore, to construct such a camera system, a high degree of processing power is necessary for the control device of the display inside the vehicle, resulting in the system being expensive or having little versatility.

One way to address this issue is to provide each camera module with a function to apply overhead processing to the captured camera image, a function to detect a recognized object in the camera image with object recognition processing, and a function to apply a marker to the recognized object in the camera image, thus allowing for an inexpensive camera system that can use an inexpensive display unit having only an image display function.

It could therefore be helpful to provide an inexpensive camera system that makes display associated with object recognition easier even when displaying an image with a display that does not have a high degree of processing power.

SUMMARY

A disclosed camera system is a camera system including a plurality of camera modules that capture images of a circumference of a vehicle, the camera modules outputting captured camera images, and a display unit inside the vehicle displaying a vehicle circumferential image generated by combining each of the images, such that each camera module includes: an object recognition unit configured to execute object recognition processing on a camera image captured by the camera module; and a communication interface configured to communicate via a vehicle network provided in the vehicle, and such that in each camera module, the communication interface outputs, to the vehicle network, coordinate information of an object recognized by the object recognition unit.

In the disclosed camera system, at least one of the camera modules may acquire coordinate information of the recognized object from another camera module via the vehicle network and use the acquired coordinate information to apply a marker to the recognized object in the vehicle circumferential image.

In the disclosed camera system, when the recognized object is positioned in both of a pair of adjacent camera images, at least one of the camera modules may use the coordinate information to generate a continuous marker extending into both of the adjacent camera images.

In the disclosed camera system, at least one of the camera modules may change at least one of a position, size, and shape of the marker.

In the disclosed camera system, the camera modules may each include a controller, and one of the controllers may act as a main controller and use the coordinate information to execute processing to apply a marker to the vehicle circumferential image.

In the disclosed camera system, the main controller may control other controllers, provided in each of the camera modules, integrally via the vehicle network.

In the disclosed camera system, the camera modules may each be allocated identification information by a processor of the vehicle, the processor being connected via the vehicle network, and the main controller may be determined in accordance with the identification information.

In the disclosed camera system, the identification information may be allocated in conformity with a negotiation protocol in a standard of the vehicle network.

In the disclosed camera system, the camera image may be an overhead image yielded by viewpoint conversion of an image captured by an imaging unit.

A disclosed camera module is a camera module used in a camera system that combines camera images captured by a plurality of camera modules into a vehicle circumferential image and displays the vehicle circumferential image with a display unit inside a vehicle, the camera module including: an imaging unit configured to capture an image of a circumference of the vehicle; an object recognition unit configured to execute object recognition processing on the image captured by the imaging unit; and a communication interface configured to communicate via a vehicle network provided in the vehicle, such that the communication interface outputs, to the vehicle network, coordinate information of an object recognized by the object recognition unit.

Furthermore, a disclosed method of controlling a camera is a method of controlling a camera when combining camera images captured by a plurality of camera modules into a vehicle circumferential image and displaying the vehicle circumferential image with a display unit inside a vehicle, the method including: a recognition step each camera module executing object recognition processing to recognize an object in the camera image captured by the camera module; and an output step each camera module outputting, to a vehicle network provided in the vehicle, coordinate information of the object recognized in the recognition step.

The disclosed camera system, camera module, and method of controlling a camera provide an inexpensive camera system that make display associated with object recognition easier even when displaying an image with a display that does not have a high degree of processing power.

DETAILED DESCRIPTION

The following illustrates the disclosed embodiments with reference to the drawings.

Figure 1:
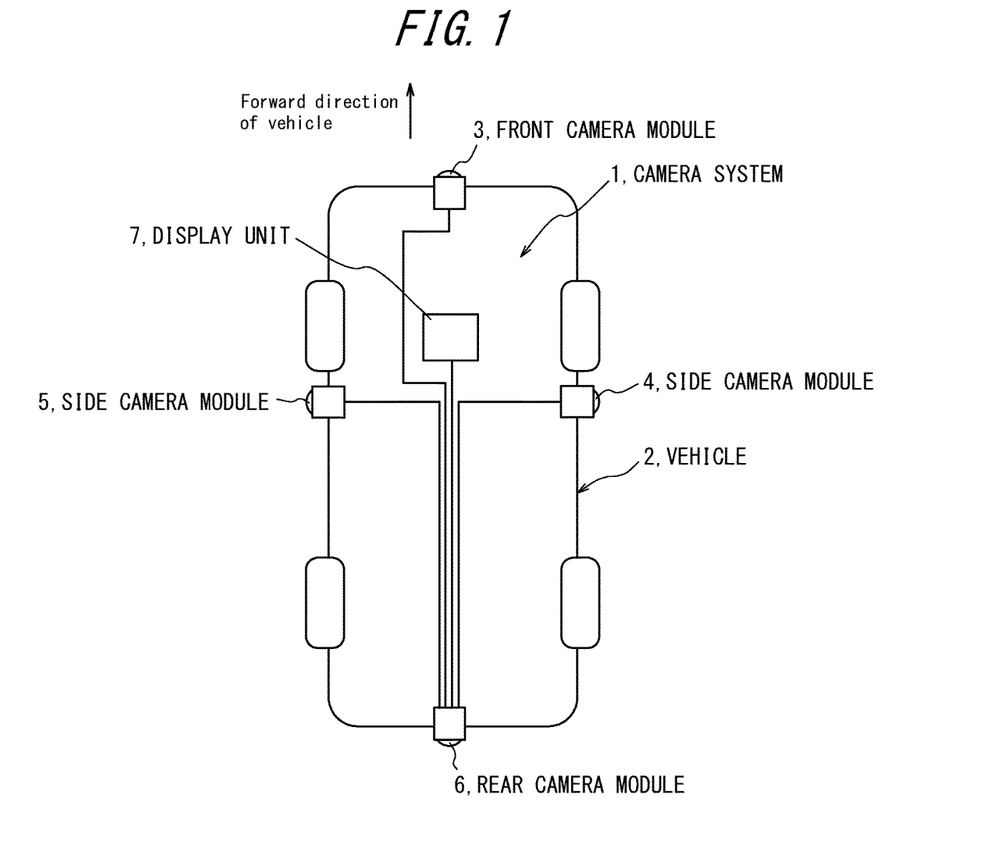
FIG. 1 schematically illustrates the structure of a vehicle provided with a camera system according to one of the disclosed embodiments.
Figure 2:
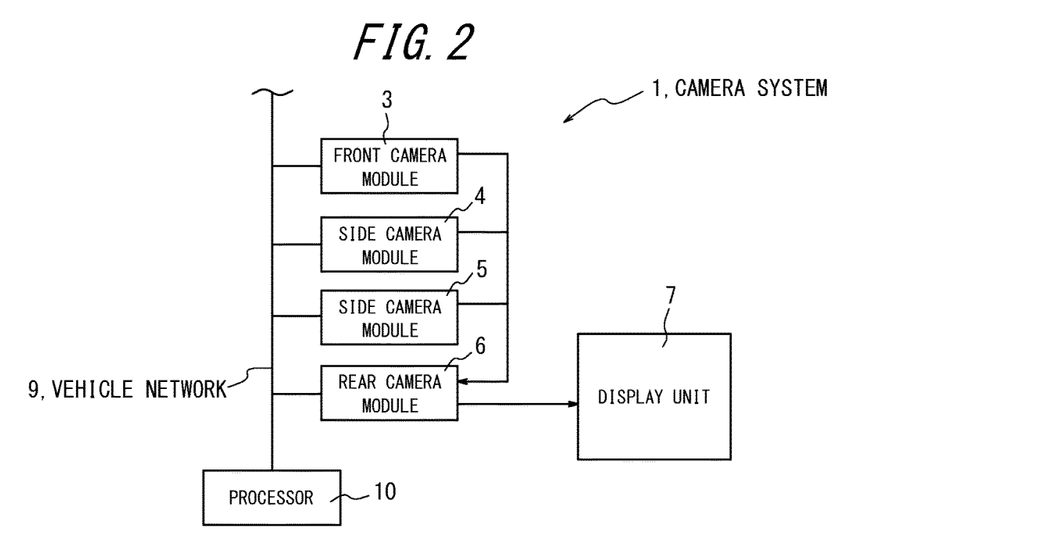
FIG. 2 is a block diagram illustrating an example of the structure of a camera system according to one of the disclosed embodiments.

As illustrated in FIGS. 1 and 2, a camera system 1 according to one of the disclosed embodiments is provided in a vehicle 2 such as an automobile. The camera system 1 is provided with four camera modules 3 to 6 attached to the front, rear, and sides of the vehicle 2, and with a display unit 7 provided inside the vehicle.

Figure 3:
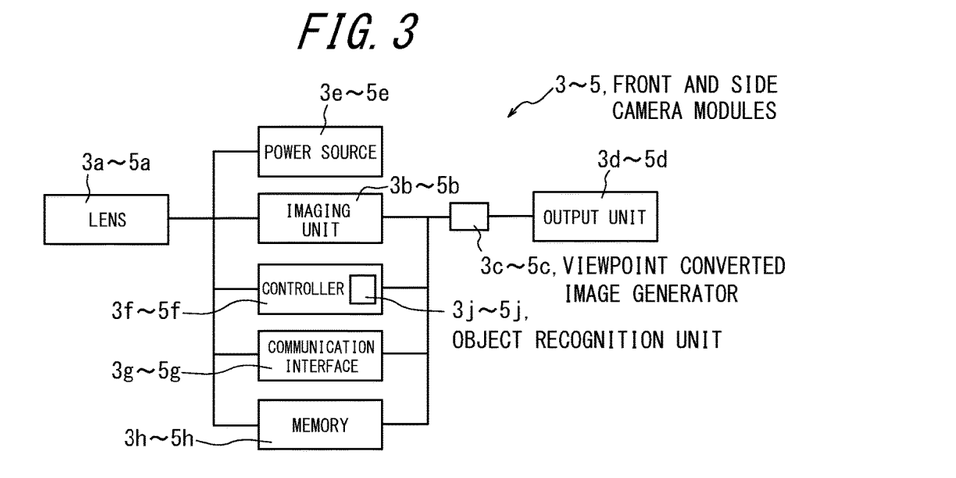
FIG. 3 is a block diagram illustrating an example of the structure of the front camera module and the side camera modules in FIG. 2.

As illustrated in FIG. 3, the front camera module 3 attached to the front end of the vehicle 2 is provided with a lens 3a, an imaging unit 3b, a viewpoint converted image generator 3c, an output unit 3d, a power source 3e, a controller 3f, a communication interface 3g, and a memory 3h. Similarly, the side camera module 4 attached to the right side of the vehicle 2 and the side camera module 5 attached to the left side of the vehicle 2 are provided with respective lenses 4a and 5a, imaging units 4b and 5b, viewpoint converted image generators 4c and 5c, output units 4d and 5d, power sources 4e and 5e, controllers 4f and 5f, communication interfaces 4g and 5g, and memories 4h and 5h. The front camera module 3 and the side camera modules 4 and 5 have basically the same structure. Therefore, in FIG. 3, labels corresponding to the camera modules 3 to 5 are applied to the units configuring the camera modules 3 to 5.

Figure 4:
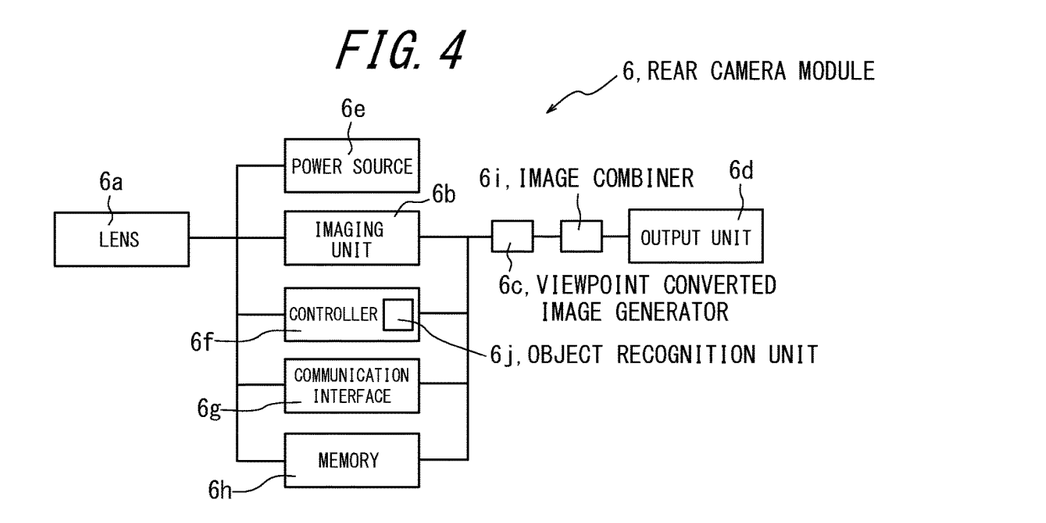
FIG. 4 is a block diagram illustrating an example of the structure of the rear camera module in FIG. 2.

As illustrated in FIG. 4, the rear camera module 6 attached to the back end of the vehicle 2 is provided with a lens 6a, an imaging unit 6b, a viewpoint converted image generator 6c, an output unit 6d, a power source 6e, a controller 6f, a communication interface 6g, and a memory 6h, and also with an image combiner 6i. The image combiner 6i represents software processing executed within the controller 6f and should be listed within the controller 6f, like the object recognition units 3j to 6j. To simplify the explanation, however, the image combiner 6i is described as a separate block.

In the drawings, the image combiner is only depicted within the rear camera module 6 and is not depicted in the front camera module 3 or the side camera modules 4 and 5. The image combiner 6i, however, may be provided equally in each of the camera modules 3 to 6. In other words, via the below-described processing, the software for the image combiner may be activated only in the camera module recognized as the rear camera module 6, or only in the camera module recognized as the camera module that is to be the main controller, with the software for the image combiner being deactivated in the other camera modules. This approach makes it possible to configure each camera module in the same way, which lowers the overall cost.

The power sources 3e to 6e provided in the camera modules 3 to 6 are each connected to the vehicle's battery and supply power to all portions of the camera modules 3 to 6, such as the imaging units 3b to 6b, the controllers 3f to 6f, and the like. The memories 3h to 6h provided in the camera modules 3 to 6 can, as necessary, store data and the like required to control the imaging units 3b to 6b, the viewpoint converted image generators 3c to 6c, the controllers 3f to 6f, the communication interfaces 3g to 6g, and the like.

The camera modules 3 to 6 capture images of the vehicle circumference with the lenses 3a to 6a and the imaging units 3b to 6b. For example, the front camera module 3 uses the lens 3a and the imaging unit 3b to capture a circumferential image at the front of the vehicle 2 at a predetermined angle of view. The side camera module 4 on the right side uses the lens 4a and the imaging unit 4b to capture a circumferential image at the right side of the vehicle 2 at a predetermined angle of view, and the side camera module 5 on the left side uses the lens 5a and the imaging unit 5b to capture a circumferential image at the left side of the vehicle 2 at a predetermined angle of view. Furthermore, the rear camera module 6 uses the lens 6a and the imaging unit 6b to capture a circumferential image at the back of the vehicle 2 at a predetermined angle of view.

CMOS, CCD, or other such image sensors are used as the imaging units 3b to 6b. Lenses with a wide angle of view, such as fisheye lenses, are used as the lenses 3a to 6a.

As illustrated in FIGS. 3 and 4, the imaging units 3b to 6b of the camera modules 3 to 6 are respectively connected to the viewpoint converted image generators 3c to 6c, and the images captured by the imaging units 3b to 6b are loaded into the viewpoint converted image generators 3c to 6c. The viewpoint converted image generators 3c to 6c correct distortion in the images loaded from the imaging units 3b to 6b and convert the viewpoint in the images to generate overhead images.

As illustrated in FIG. 2, the front camera module 3 is connected to the rear camera module 6. The overhead image generated by the front camera module 3 is output from the output unit 3d as the camera image captured by the camera module 3 and is input into the image combiner 6i provided in the rear camera module 6. Similarly, the side camera modules 4 and 5 are connected to the rear camera module 6. The overhead images generated by the side camera modules 4 and 5 are output from the output units 4d and 5d as the camera images captured by the camera modules 4 and 5 and are input into the image combiner 6i provided in the rear camera module 6.

The image combiner 6i generates a vehicle circumferential image by combining the overhead image (camera image) generated by the viewpoint converted image generator 6c of the rear camera module 6 with the three overhead images (camera images) input from the other camera modules 3 to 5, combining the images in an arrangement corresponding to the positions at which the camera modules 3 to 6 are attached to the vehicle 2.

As illustrated in FIG. 2, the rear camera module 6 is connected to the display unit 7. The output unit 6d of the rear camera module 6 converts the vehicle circumferential image generated by the image combiner 6i to an appropriate format for the display unit 7 (for example, NTSC) and outputs the result to the display unit 7.

Figure 5:
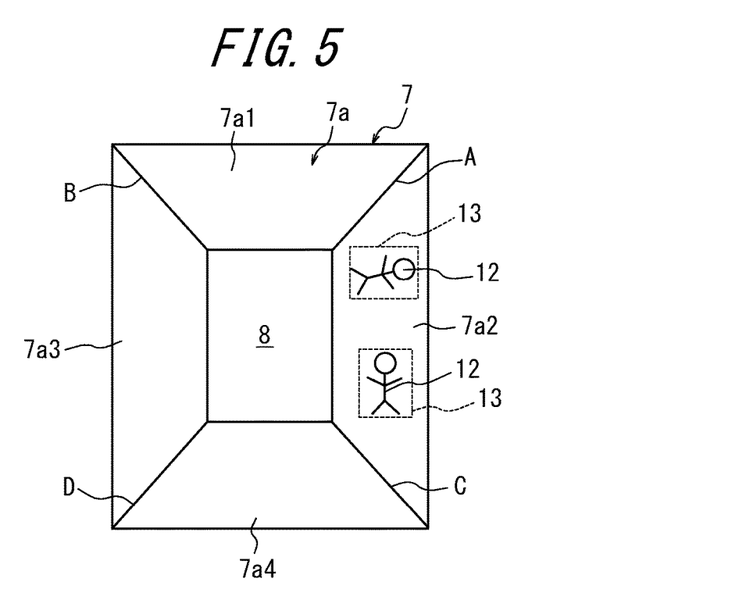
FIG. 5 illustrates an example of a vehicle circumferential image displayed on a display unit.

As illustrated in FIG. 5, the display unit 7 displays the vehicle circumferential image input from the rear camera module 6 on a screen 7a of the display unit 7. In other words, a vehicle model 8 is displayed in the center of the screen 7a of the display unit 7, and the camera image (overhead image) captured by the front camera module 3 is displayed in a divided range 7a1 at the top of the screen along the vehicle model 8. The camera images (overhead images) captured by the side camera modules 4 and 5 are respectively displayed in a divided range 7a2 at the right of the screen and a divided range 7a3 at the left of the screen in the display unit 7. Furthermore, the camera image (overhead image) captured by the rear camera module 6 is displayed in a divided range 7a4 at the bottom of the screen in the display unit 7.

A display device such as a liquid crystal display, an organic EL display, or the like may be used as the display unit 7.

As illustrated in FIG. 2, the camera modules 3 to 6 are connected to a vehicle network (in-vehicle LAN) 9 provided in the vehicle 2. The vehicle network 9 may, for example, be a bus line for mobile machines that uses a protocol such as Controller Area Network (CAN), FlexRay, Local Interconnect Network (LIN), or the like.

The camera modules 3 to 6 can communicate via the respective communication interfaces 3g to 6g via the vehicle network 9. In other words, each of the camera modules 3 to 6 can communicate with the other camera modules 3 to 6 via the respective communication interfaces 3g to 6g via the vehicle network 9. As illustrated in FIG. 1, a processor 10 of the vehicle 2, such as an engine control unit (ECU), shift position sensor, or the like is connected to the vehicle network 9, and each of the camera modules 3 to 6 can communicate with the processor 10 via the respective communication interfaces 3g to 6g via the vehicle network 9.

Communication devices conforming to the protocol of the vehicle network 9 are used as the communication interfaces 3g to 6g. For example, when the vehicle network 9 is a CAN, then CAN transceivers are used.

The controllers 3f to 6f provided in the camera modules 3 to 6 each comprise extractions of software functional blocks operating on a microcomputer provided with a CPU. As illustrated in FIGS. 3 and 4, one of the functions thereof is that of the object recognition units 3j to 6j. The object recognition units 3j to 6j execute object recognition processing on images captured by the imaging units 3b to 6b of the respective camera modules 3 to 6. In other words, by executing object recognition processing on images captured by the imaging units 3b to 6b, the object recognition units 3j to 6j can recognize predetermined objects, such as a pedestrian, bicycle, or the like, located within the images. An object recognition technique such as pattern recognition may be used for the object recognition processing by the object recognition units 3j to 6j.

When a predetermined object, such as a pedestrian or bicycle, is recognized in the images captured by the respective imaging units 3b to 6b of the camera modules 3 to 6, then based on coordinate information of the object recognized by the object recognition units 3j to 6j, the controllers 3f to 6f of the camera modules 3 to 6 display a marker for the recognized object on the image. The controllers 3f to 6f may apply the marker on the image by, for example, a method to overlay (overlapping display) a marker image on the image captured by the imaging units 3b to 6b. In this way, when a predetermined object is located in the image captured by the respective imaging units 3b to 6b, the camera modules 3 to 6 output, from the output units 3d to 6d, camera images in which the marker is applied to the object. The coordinate information represents coordinates of the rendered object recognized as a predetermined object. The object recognition units 3j to 6j each calculate the coordinates within the image captured by the respective camera modules 3 to 6 taking into consideration a distortion component due to imaging with a fisheye lens (lenses 3a to 6a).

Accordingly, as illustrated in FIG. 5, when a predetermined object 12 is located in the vehicle circumferential image displayed on the screen 7a of the display unit 7, then a vehicle circumferential image in which a marker 13 is applied to the object 12 is displayed, since the vehicle circumferential image is formed by combining the camera images of the camera modules 3 to 6. Applying a marker 13 to an object 12 in the vehicle circumferential image allows a driver or the like to more easily recognize a predetermined object 12 displayed in the vehicle circumferential image. In the illustrated example, the marker 13 is displayed as a rectangular, dotted frame, yet in accordance with the size or shape of the object 12, the marker 13 may be set to a variety of sizes and shapes, such as a rectangle or circle, or may be represented by a solid line or the like.

Figure 6:
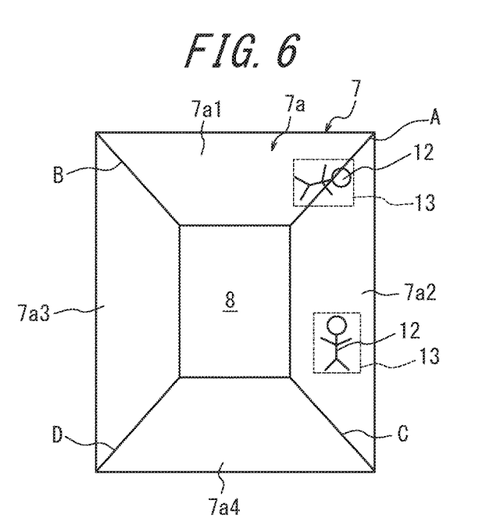
FIG. 6 illustrates an example of a state in which a recognized object in the vehicle circumferential image displayed on the display unit is positioned on the boundary between adjacent camera images.

As illustrated in FIG. 6, when a predetermined object 12 is positioned in a pair of adjacent camera images displayed in the divided range 7a1 and the divided range 7a2, i.e. on a boundary A between the pair of camera images, then the marker 13 for the object 12 is displayed extending into both of these camera images. In this case, a portion of the marker 13 is displayed on the camera image displayed in the divided range 7a1, and the remaining portion is displayed on the other camera image displayed in the divided range 7a2. Therefore, when displaying the markers 13 on the camera images, the markers 13 displayed on the camera images need to be joined smoothly for proper display as one marker 13.

Accordingly, in the disclosed camera system 1, the camera modules 3 to 6 output the coordinate information of the predetermined object 12 recognized in the image captured by the respective imaging units 3b to 6b to the vehicle network 9 via the communication interfaces 3g to 6g so as to share the coordinate information via the vehicle network 9 with the other camera modules 3 to 6. The camera module, among the camera modules 3 to 6, that outputs one of the adjacent camera images is configured to acquire the coordinate information of the recognized object via the vehicle network 9 from the camera module, among the camera modules 3 to 6, that outputs the other one of the adjacent camera images and to use this coordinate information to generate the marker 13 so that the marker 13 joins smoothly with the marker 13 displayed on the other camera image.

In greater detail, as illustrated in FIG. 6, when a predetermined object 12 is positioned on the boundary A between the camera image of the front camera module 3 displayed in the divided range 7a1 and the camera image of the side camera module 4 on the right side displayed in the divided range 7a2, the marker 13 is displayed by the following procedure.

When the front camera module 3 recognizes a predetermined object 12 with the object recognition unit 3j in the image captured by the corresponding imaging unit 3b, then the coordinate information, within the image, of the object 12 that was recognized, i.e. the recognized object 12, is output to the vehicle network 9 via the communication interface 3g. Similarly, when the side camera module 4 on the right side recognizes a predetermined object 12 with the object recognition unit 4j in the image captured by the corresponding imaging unit 4b, then the coordinate information, within the image, of the recognized object 12 is output to the vehicle network 9 via the communication interface 4g. The coordinate information of the recognized object 12 output by the communication interfaces 3g and 4g may include information allowing for generation of a marker 13 that surrounds the recognized object 12, for example by adding information on the size of the recognized object 12 to coordinate information on the center position thereof.

Figure 7:
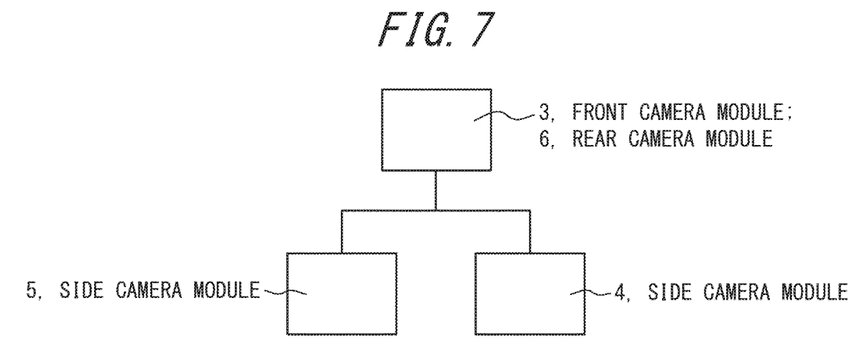
FIG. 7 illustrates an example of the relationship between the main controller and the controllers.

In conformity with a negotiation protocol in the standard of the vehicle network 9, the camera modules 3 to 6 are each allocated identification information, such as an address, by the processor 10, such as an ECU, connected to the vehicle network 9. Based on the identification information, master and slave relationships are set among the camera modules 3 to 6. For example, in this embodiment, when a predetermined object 12 is positioned on the boundary A or the boundary B in FIG. 6, then as illustrated in FIG. 7, the front camera module 3 is set as the master, and the side camera modules 4 and 5 are set as slaves. When a predetermined object 12 is positioned on the boundary C or the boundary D in FIG. 6, then as illustrated in FIG. 7, similarly the rear camera module 6 is set as the master, and the side camera modules 4 and 5 are set as slaves. Accordingly, when an object 12 is positioned on the boundary A illustrated in FIG. 6, the front camera module 3 is set as the master, and the side camera module 4 on the right side is set as the slave. Since the camera image of the front camera module 3 and the camera image of the rear camera module 6 do not share a boundary, no master/slave relationship is established between the camera modules 3 and 6.

Figure 8:
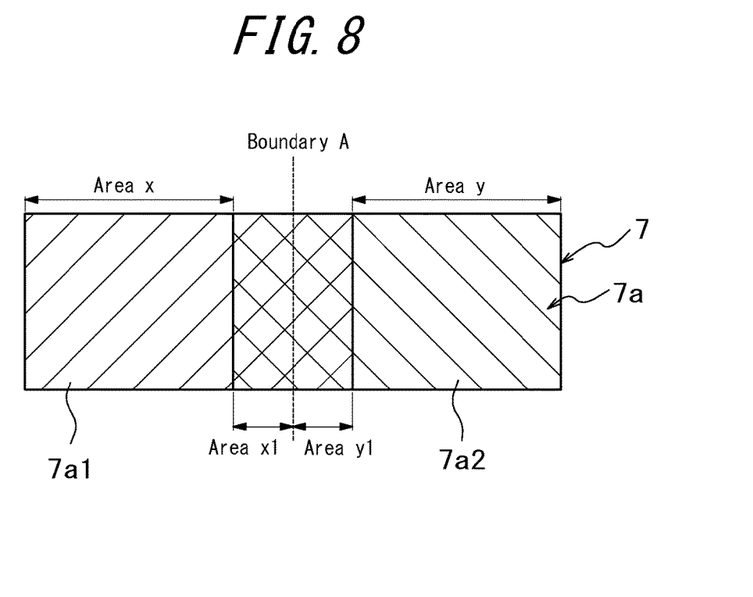
FIG. 8 illustrates allocated areas, in adjacent camera images, for marker application by the camera modules.

When a predetermined object 12 is positioned on the boundary A between the camera image of the front camera module 3 and the camera image of the side camera module 4 on the right side, i.e. when an object 12 is positioned extending into an area x1 of the camera image of the front camera module 3 and an area y1 of the camera image of the side camera module 4, as schematically illustrated in FIG. 8, then the side camera module 4, which is the slave, acquires coordinate information of the recognized object 12 in the camera image of the front camera module 3 from the front camera module 3 via the vehicle network 9. By using the coordinate information of the recognized object 12 acquired from the front camera module 3, i.e. based on the coordinate information of the recognized object 12 in the camera module's own camera image and the coordinate information of the recognized object 12 in the camera image of the front camera module 3, the controller 4f of the side camera module 4 changes at least one of the position, shape, and size of the marker 13 that the controller 4f generates, so that the marker 13 can be smoothly joined with the marker 13 generated by the front camera module 3. In this way, the controller 4f of the side camera module 4 adjusts the position, shape, and size of the marker 13 generated by the side camera module 4 so as to match the position, shape, and size of the marker 13 generated by the front camera module 3 and acquired via the vehicle network 9.

The case of an object 12 being positioned on the boundary A in the vehicle circumferential image has been described. When an object 12 is positioned on the boundary B in the vehicle circumferential image, the front camera module 3 becomes the master, the side camera module 5 on the left side becomes the slave, and similar control is performed. When an object 12 is positioned on the boundary C in the vehicle circumferential image, the rear camera module 6 becomes the master, the side camera module 4 on the right side becomes the slave, and similar control is performed. Furthermore, when an object 12 is positioned on the boundary D in the vehicle circumferential image, the rear camera module 6 becomes the master, the side camera module 5 on the left side becomes the slave, and similar control is performed.

In this way, when a predetermined object 12 is positioned on one of the boundaries A to D between adjacent camera images, one of the controllers 3f to 6f in the camera modules 3 to 6 acquires coordinate information, from another one of the camera modules 3 to 6 via the vehicle network 9, on the object recognized in the image captured by the corresponding one of the imaging units 3b to 6b in the other one of the camera modules 3 to 6 and uses the coordinate information to apply a marker 13 to its own camera image. Accordingly, even if a predetermined object 12 is positioned on one of the boundaries A to D between adjacent camera images, a continuous marker 13 extending into adjacent camera images can be applied accurately to the recognized object 12.

On the other hand, when a predetermined object 12 is located within an area x in the camera image of the front camera module 3, as schematically illustrated in FIG. 8, a marker 13 is applied to the object 12 by the controller 3f of the front camera module 3. Similarly, when a predetermined object is located within an area y in the camera image of the side camera module 4, a marker 13 is applied to the object 12 by the controller 4f of the side camera module 4.

Figure 9:
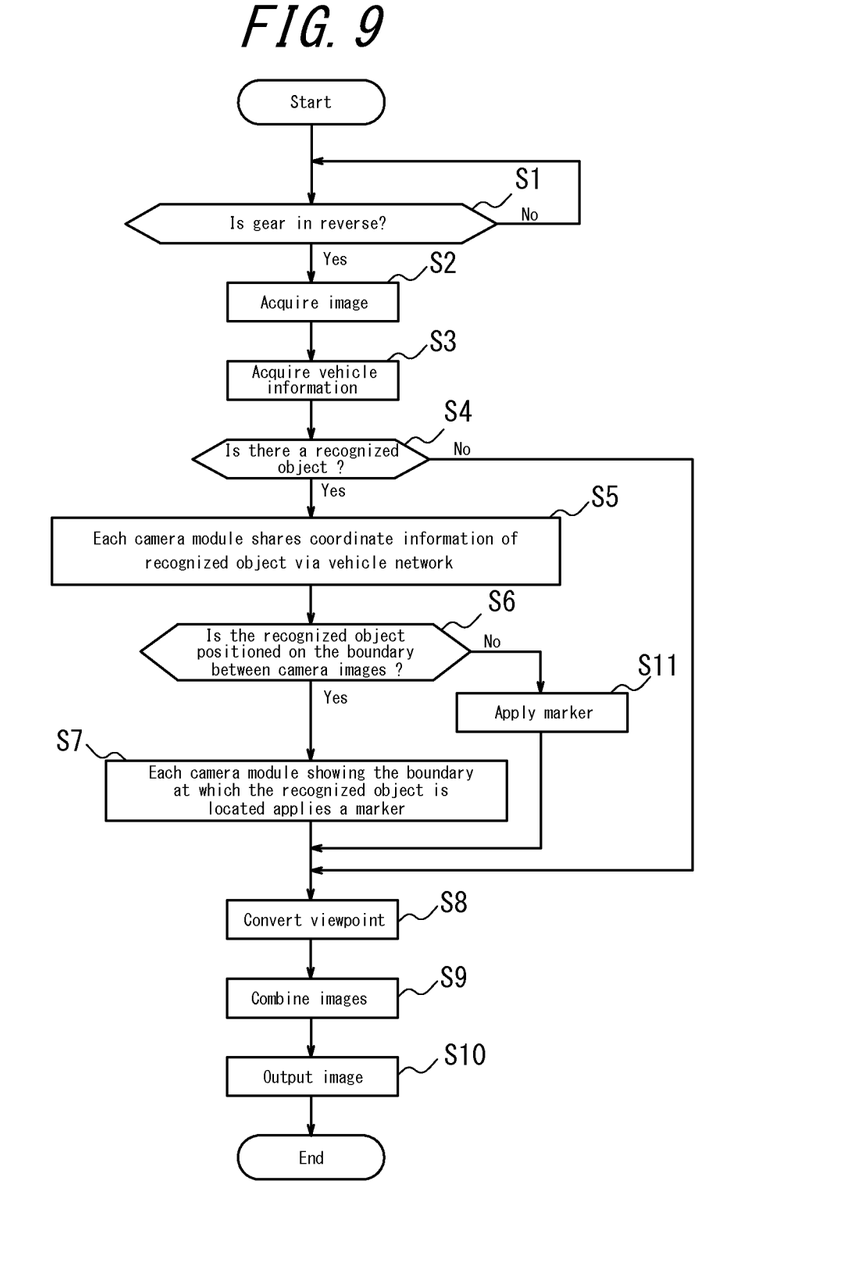
FIG. 9 is a flowchart of control for marker display in a camera system according to one of the disclosed embodiments.

Next, the steps in an example of control for marker display (method of controlling a camera) in the above-described camera system 1 are described based on FIG. 9.

First, the controllers 3f to 6f of the camera modules 3 to 6 communicate with the processor 10 of the vehicle 2 via the vehicle network 9 to determine whether the gear of the vehicle 2 is in reverse (step S1). When the gear of the vehicle 2 is determined to be in reverse in step S1, the controllers 3f to 6f acquire the image captured by the imaging units 3b to 6b of the respective camera modules 3 to 6 (step S2) and acquire vehicle information, such as the vehicle speed, the steering angle of the steering wheel, and the like via the vehicle network 9 (step S3). In this case, a marker 13 is applied to an object 12 recognized in the vehicle circumferential image only when the vehicle 2 is moving in reverse, yet a configuration may be adopted to apply a marker 13 to an object 12 recognized in the vehicle circumferential image when the vehicle 2 is moving forward or is stopped as well.

Next, the controllers 3f to 6f determine, with object recognition processing, whether a predetermined object 12 is recognized in the acquired image (step S4, recognition step). When a recognized object 12 is determined to be located in the image in step S4, the camera modules 3 to 6 output coordinate information of the recognized object 12 to the vehicle network 9 (step S5, output step) so as to share the information between the camera modules 3 to 6.

Next, the controllers 3f to 6f determine whether the recognized object 12 is positioned on one of the boundaries A to D between a pair of adjacent camera images (step S6). When it is determined in step S6 that the recognized object 12 is positioned on one of the boundaries A to D between adjacent camera images, the controllers 3f to 6f in the pair of camera modules 3 to 6 that captured the camera images apply a marker 13 to the respective camera images. At this time, one of the controllers 3f to 6f of the camera modules 3 to 6 acquires, via the vehicle network 9, the coordinate information of the recognized object 12 in the camera image of the other one of the camera modules 3 to 6. This one of the controllers 3f to 6f then uses the coordinate information to apply, to its own camera image, a marker 13 that connects smoothly to the marker 13 displayed in the adjacent camera image (step S7, application step).

Upon the marker 13 being applied to the recognized object 12 in the image, the image in each of the camera modules 3 to 6 is subjected to viewpoint conversion by the viewpoint converted image generators 3c to 6c to yield overhead images, i.e. camera images (step S8). The overhead images of the camera modules 3 to 6 generated in step S8 are combined by the image combiner 6i of the rear camera module 6 to yield a vehicle circumferential image (step S9), and this image is output to the display unit 7 from the output unit 6d of the rear camera module 6 (step S10).

On the other hand, when it is determined in step S4 that there is no recognized object 12, the processing from step S8 to step S10 is executed without applying a marker 13 to the image.

Furthermore, when it is determined in step S6 that the object 12 is not positioned on the boundary between adjacent camera images, the one of the camera modules 3 to 6 that captured the camera image in which the object 12 is positioned applies a marker 13 to the recognized image 12 in the camera image (step S11), and the processing from step S8 to step S10 is then executed.

As described above, in the camera system 1, the camera modules 3 to 6 are provided with object recognition units 3j to 6j that detect an object 12 in the captured images using object recognition processing and with controllers 3f to 6f that apply a marker 13 to the recognized object 12 in the captured images. As a result, even when using an inexpensive display unit 7 that, for example, only has an image display function, it is still possible to implement the camera system 1 to allow for display associated with object recognition processing, thereby reducing the cost of the system as a whole. Providing the camera modules 3 to 6 with the viewpoint converted image generators 3c to 6c that convert the camera images to overhead images also allows for the use of an inexpensive display unit 7 that only has an image display function, thereby reducing the cost of the camera system 1.

Furthermore, in the camera system 1, the camera modules 3 to 6 are provided with the respective communication interfaces 3g to 6g that output, to the vehicle network 9, coordinate information of the object 12 recognized in the images captured by the corresponding imaging units 3b to 6b. Therefore, when a recognized object 12 is positioned on one of the boundaries A to D between adjacent camera images, the two camera modules 3 to 6 that apply a marker 13 to the camera images can, via the vehicle network 9, use the coordinate information of the object 12 recognized in the image of the other one of the camera modules 3 to 6, so that the corresponding controllers 3f to 6f of the camera modules 3 to 6 can accurately apply the marker 13 to the recognized object 12.

This disclosure is based on the drawings and embodiments, yet it is to be noted that various changes and modifications will be apparent to those skilled in the art based on this disclosure. Therefore, such changes and modifications are to be understood as included within the scope of the disclosure.

In the above embodiments, the camera modules 3 to 6 that are slaves acquire, via the vehicle network 9, coordinate information of the recognized object 12 from the one of the camera modules 3 to 6 that is the master and use the acquired coordinate information to apply a marker 13 to the image, yet this example is not limiting. Any configuration may be adopted in which at least one of the camera modules 3 to 6 acquires, via the vehicle network 9, coordinate information of the recognized object 12 from the other camera modules 3 to 6 and uses the acquired coordinate information to apply a marker 13 to the image. For example, both of the camera modules, among the camera modules 3 to 6, that output adjacent camera images may acquire, via the vehicle network 9, coordinate information of the recognized object from the other one of the camera modules 3 to 6 and use the acquired coordinate information to apply a marker 13 to the image.

Furthermore, one of the controllers 3f to 6f of the camera modules 3 to 6 may be set as a main controller, and the one of the controllers 3f to 6f set as the main controller may acquire, via the vehicle network 9, coordinate information of the recognized object 12 from all of the other camera modules 3 to 6 and use the acquired coordinate information to apply a marker 13 to all of the camera images, i.e. to the vehicle circumferential image. In this case, in conformity with a negotiation protocol in the standard of the vehicle network 9, the camera modules 3 to 6 may each be allocated identification information, such as an address, by the processor 10, such as an ECU, connected to the vehicle network 9. One of the controllers 3f to 6f of the camera modules 3 to 6 may then be set as the main controller in accordance with the allocated identification information. The one of the controllers 3f to 6f set as the main controller acquires, via the vehicle network 9, the coordinate information of the recognized object 12 in the other camera images from the controllers 3f to 6f of the camera modules 3 to 6. Based on the coordinate information of the recognized object 12 in its own camera image and the coordinate information of the recognized object 12 in the other camera images, the main controller executes processing to apply a marker to all of the camera images (vehicle circumferential image). The one of the controllers 3f to 6f set as the main controller can thus integrally control the other controllers 3f to 6f via the vehicle network 9 and apply the marker 13 to the vehicle circumferential image.

In this case, software with a function to apply the marker 13 to the image is activated only for the controller 6f set as the main controller, i.e. the controller 6f of the rear camera module 6, whereas the software with a function to apply the marker 13 to the image is deactivated for the controllers 3f to 5f of the other camera modules 3 to 5. When the controller of another camera module is set as the main controller, the software with a function to apply the marker 13 to the image is activated only for that controller, whereas the software with this function is deactivated for the controllers of the other camera modules. Accordingly, even when adopting a configuration such that the controller set as the main controller integrally controls the other controllers via the vehicle network 9, it is possible to use the same configuration for each of the camera modules 3 to 6, thereby reducing the overall cost of the camera system 1.

Furthermore, in the above embodiment, the vehicle 2 is provided with four camera modules 3 to 6, yet any number of camera modules 3 to 6 may be provided so long as images of the circumference of the vehicle 2 can be captured.

In the above embodiment, the marker 13 is applied to the images captured by the imaging units 3b to 6b, and the images with the marker 13 applied thereto are output to the display unit 7, yet this configuration is not limiting. A marker image generated separately from the camera images may be input into the display unit 7 via the vehicle network 9, and the display unit 7 may be caused to display the marker image in overlap on the camera images.

Furthermore, in the above embodiment, the camera modules 3 to 6 are provided with the viewpoint converted image generators 3c to 6c and output the images captured by the imaging units 3b to 6b to the display unit 7 after processing the images into overhead images with the viewpoint converted image generators 3c to 6c, yet this configuration is not limiting. The images captured by the imaging units 3b to 6b may be output without modification to the display unit 7. Alternatively, the viewpoint converted image generators 3c to 6c may also be provided only in the rear camera module 6, and the images combined by the image combiner 6i may collectively be processed into an overhead image. The viewpoint converted image generators 3c to 6c may also be provided in the display unit 7 instead, and each camera image or the vehicle circumferential image may be processed into an overhead image in the display unit 7.

In the above embodiment, the front camera module 3 and both of the side camera modules 4 and 5 are connected to the rear camera module 6, and the image combiner 6i provided in the rear camera module 6 combines the camera images captured by the camera modules 3 to 6, outputting the result to the display unit 7, yet this configuration is not limiting. Alternatively, all of the camera modules 3 to 6 may be connected directly to the display unit 7. In this case, the rear camera module 6 may have the same configuration as the other camera modules 3 to 5 illustrated in FIG. 3, thereby increasing the versatility of the camera modules 3 to 6.

Furthermore, in the above embodiment, the camera modules 3 to 6 output, to the vehicle network 9 via the communication interfaces 3g to 6g, the coordinate information of the object 12 recognized in the image captured by the respective imaging units 3b to 6b. In addition to the coordinate information of the recognized object 12, the camera modules 3 to 6 may also output, to the vehicle network 9, either or both of movement vector information of the recognized object 12 and coordinate information of the marker 13 generated by the controllers 3f to 6f of the camera modules 3 to 6. In this case, in addition to the coordinate information of the recognized object 12 acquired via the vehicle network 9 from the one of the camera modules 3 to 6 that is the master, the camera modules 3 to 6 that are slaves can also use the movement vector information of the recognized object 12 and the coordinate information of the marker 13 generated by the controllers 3f to 6f of the camera modules 3 to 6 in order to generate their own marker 13. The controllers 3f to 6f can thus display the marker 13 more accurately. The coordinate information of the marker 13 may include coordinate information allowing for generation of the marker 13. For example, when the marker 13 is a rectangle, such coordinate information may be coordinate information on the reference position of the marker 13 in the camera image and information on the length, direction, and the like of each side, and when the marker 13 is a circle, such coordinate information may be coordinate information on the center position and information on the radius dimension.

Furthermore, in the above embodiment, pairs of adjacent camera images in the vehicle circumferential image are in contact on the boundaries A to D, yet as long as the object 12 can be displayed as positioned in both of the adjacent camera images, there may be a gap between the adjacent camera images.

REFERENCE SIGNS LIST

1 Camera system
2 Vehicle
3 Front camera module
4, 5 Side camera module
6 Rear camera module
3a to 6a Lens
3b to 6b Imaging unit
3c to 6c Viewpoint converted image generator
3d to 6d Output unit
3e to 6e Power source
3f to 6f Controller
3g to 6g Communication interface
3h to 6h Memory
6i Image combiner
3j to 6j Object recognition unit
7 Display unit
7a Screen
7a1 to 7a4 Divided range
8 Vehicle model
9 Vehicle network
10 Processor
11 Object recognition unit
12 Object
13 Marker
A to D Boundary
x, x1 Area
y, y1 Area

The invention claimed is:

1. A camera system comprising a plurality of camera modules that capture images of a circumference of a vehicle, the camera modules outputting captured camera images, and a display unit inside the vehicle displaying a vehicle circumferential image generated by combining each of the camera images,
wherein each camera module comprises:
an object recognition unit configured to execute object recognition processing on a camera image captured by the camera module;
a communication interface configured to communicate via a vehicle network provided in the vehicle, and
a controller configured to apply a marker to the camera image, wherein
in each camera module:
the object recognition unit calculates coordinate information specifying a position of an object recognized by the object recognition unit,
the communication interface outputs, to the vehicle network, the coordinate information, and in a case that the recognized object is positioned on a boundary between the camera image and an adjacent camera image captured by another camera module, the controller:
  uses coordinate information received from another camera module via the vehicle network, to generate a first marker for the recognized object, that connects to a second marker displayed on the adjacent camera image, and
  applies the first marker to the recognized object in the camera image, wherein
  the adjacent camera image is a camera image displayed adjacent to the camera image on the display unit.

2. The camera system of claim 1, wherein the controller changes at least one of a position, size, and shape of the first marker.

3. The camera system of claim 1, wherein the controller in at least one of the camera modules acts as a main controller and uses the coordinate information to execute processing to apply the marker to the vehicle circumferential image.

4. The camera system of claim 3, wherein the main controller controls other controllers, provided in each of the camera modules, integrally via the vehicle network.

5. The camera system of claim 4, wherein the camera modules are each allocated identification information by a processor of the vehicle, the processor being connected via the vehicle network, and the main controller is determined in accordance with the identification information.

6. The camera system of claim 5, wherein the identification information is allocated in conformity with a negotiation protocol in a standard of the vehicle network.

7. The camera system of claim 1, wherein the camera image is an overhead image yielded by viewpoint conversion of an image captured by an imaging unit.

8. A camera module used in a camera system that combines camera images captured by a plurality of camera modules into a vehicle circumferential image and displays the vehicle circumferential image with a display unit inside a vehicle, the camera module comprising:
  an imaging unit configured to capture an image of a circumference of the vehicle;
  an object recognition unit configured to execute object recognition processing on the image captured by the imaging unit; and
  a communication interface configured to communicate via a vehicle network provided in the vehicle, wherein
  the object recognition unit calculates coordinate information specifying a position of an object recognized by the object recognition unit,
  the communication interface outputs, to the vehicle network, the coordinate information specifying the position of the object recognized by the object recognition unit, and
  in a case that the recognized object is positioned on a boundary between the image captured by the imaging unit and an adjacent camera image captured by another camera module, the camera module:
    uses coordinate information received from another camera module via the vehicle network, to generate a first marker for the recognized object, that connects to a second marker displayed on the adjacent camera image, and
    applies the first marker to the recognized object in the image captured by the imaging unit, wherein
    the adjacent camera image is a camera image displayed adjacent to the image captured by the imaging unit on the display unit.

9. A method of controlling a camera when combining camera images captured by a plurality of camera modules into a vehicle circumferential image and displaying the vehicle circumferential image with a display unit inside a vehicle, wherein at least one camera module comprises an object recognition unit configured to execute object recognition processing on the camera image captured by the camera module, the method comprising:
  a recognition step with each camera module executing the object recognition processing to recognize an object in the camera image captured by the camera module, wherein the recognition step includes calculating, by the object recognition unit, coordinate information specifying a position of the object recognized by the object recognition unit;
  an output step with each camera module outputting, to a vehicle network provided in the vehicle, the coordinate information specifying the position of the object recognized in the recognition step, and
  a marker application step, wherein each camera module, in a case that the recognized object is positioned on a boundary between the camera image and an adjacent camera image captured by another camera module:
    uses coordinate information received from another camera module via the vehicle network, to generate a first marker for the recognized object, that connects to a second marker displayed on the adjacent camera image, and
    applies the first marker to the recognized object in the camera image, wherein
  the adjacent camera image is a camera image displayed adjacent to the camera image on the display unit.

* * * * *